United States Patent
Bonk et al.

(10) Patent No.: US 8,065,174 B2
(45) Date of Patent: Nov. 22, 2011

(54) SYSTEMS AND METHODS FOR EVALUATING BUSINESS-CRITICAL CRITERIA RELATING TO EXPLORING ENTITY MOBILITY/PRODUCTIVITY OPPORTUNITIES

(75) Inventors: Jason Bonk, Chicago, IL (US); Kristin Chouteau, Charlotte, NC (US); Alex Costa, Atlanta, GA (US); Michael Hanes, Weddington, NC (US); Jill Heddleson, Charlotte, NC (US); Melinda Jones, Harrisburg, NC (US); Brenda Lahaie, Rock Hill, SC (US)

(73) Assignee: Bank of America Corporation, Charlotte, NC (US)

( * ) Notice: Subject to any disclaimer, the term of this patent is extended or adjusted under 35 U.S.C. 154(b) by 532 days.

(21) Appl. No.: 12/170,627

(22) Filed: Jul. 10, 2008

(65) Prior Publication Data
US 2010/0010846 A1  Jan. 14, 2010

(51) Int. Cl.
*G06Q 90/00* (2006.01)
(52) U.S. Cl. ............... 705/7.15; 705/7.22; 705/7.23
(58) Field of Classification Search .......... 705/7.15, 705/7.22, 7.23
See application file for complete search history.

(56) References Cited

U.S. PATENT DOCUMENTS

2003/0149613 A1 * 8/2003 Cohen et al. ............. 705/11
2009/0327051 A1 * 12/2009 Nerby .................... 705/11

OTHER PUBLICATIONS

Anne Millen Porter's article: Supplier evaluation revisited (need for companies' purchasing agents to evaluate and rate their suppliers; includes related articles) Copyright 1991.*

* cited by examiner

*Primary Examiner* — Beth V Boswell
*Assistant Examiner* — Adrian McPhillip
(74) *Attorney, Agent, or Firm* — Weiss & Arons LLP; Michael Springs

(57) ABSTRACT

Systems, methods and computer-readable media for evaluating business-critical criteria relating to exploring entity mobility/productivity opportunities are provided. A method according to the invention may include calculating a hierarchy of a plurality of decision elements regarding the opportunities. The calculating can include forming a matrix of values corresponding to the relative importance of each of the decision elements with respect to one another. The method can also include calculating a weighted composite score for each sub-process specified in each of the plurality of decision elements. The method may include compiling a favorability rating for each sub-process. The favorability rating for each sub-process may be based, at least in part, on the weighted composite score for each sub-process and the matrix of values corresponding to the relative importance of each of the decision elements with respect to one another. Finally, the method may include ranking each favorability rating to form a favorability index.

9 Claims, 9 Drawing Sheets

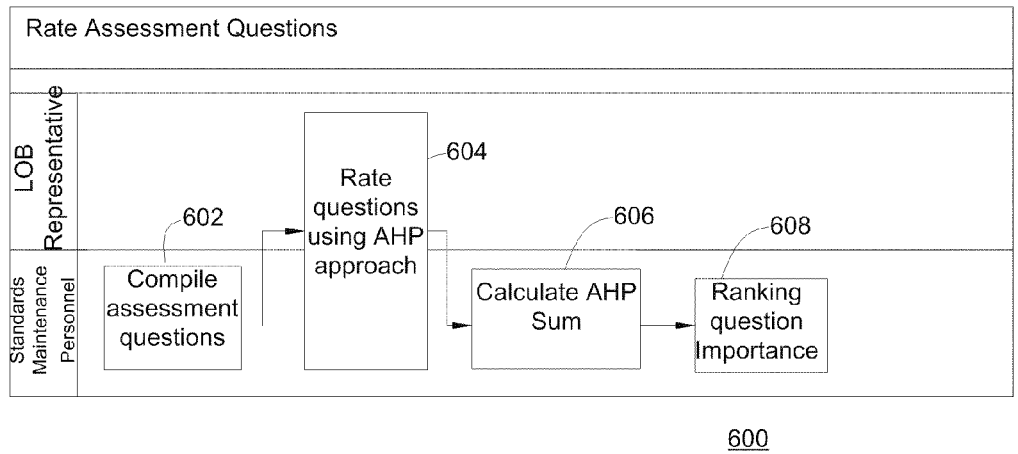

FIG. 6

Analytical Hierarchy Process (AHP)

A hierarchy of decision elements (from the assessment questions) is used to make comparisons to identify a ranking matrix.

| | Measurement System | Management Routines | Documentation | Mobility Restrictions | Standardization | Complexity | SUM | RANK |
|---|---|---|---|---|---|---|---|---|
| 702 — Measurement System | | 1 | 3 | 0.1111 | 0.3333 | 0.3333 | 0.462 | 4 |
| 704 — Management Routines | 1 | | 3 | 0.1111 | 0.3333 | 0.3333 | 0.462 | 4 |
| 706 — Documentation | 0.3333 | 0.3333 | | 0.1111 | 0.3333 | 0.3333 | 0.2987 | 6 |
| 708 — Mobility Restrictions | 9 | 9 | 9 | | 9 | 9 | 3.0939 | 1 |
| 710 — Standardization | 3 | 3 | 3 | 0.1111 | | 0.3333 | 0.7425 | 3 |
| 712 — Complexity | 3 | 3 | 3 | 0.1111 | 3 | | 0.941 | 2 |
| Sum | 16.333 | 16.333 | 21 | 0.5556 | 13 | 10.333 | | |

Weighted Composite Score

Example of Measurement System weighted composite score based on FTE $$=((C21*B21)+(C22*B22)+(C23*B23)+(C24*B24))/((C21+C22+C23+C24)$$

| | Assessment Score | FTE | |
|---|---|---|---|
| | A | B | C |
| 21 | Develop | 0 | 6.91 |
| 22 | | 1 | 10.645 |
| 23 | | 3 | 6.834 |
| 24 | | 9 | 15.779 |
| 25 | Evaluate | 0 | 6.14 |
| 26 | | 1 | 12.349 |
| 27 | | 3 | 16.16 |
| 28 | | 9 | 6.495 |
| 29 | Implement | 0 | 17.257 |
| 30 | | 1 | 13.183 |
| 31 | | 3 | 79.92 |
| 32 | | | |

4.310844

2.899183

5.305534

The rank to value (i.e., 100%=9 50%=3, 25%=1, 0%=0) is a weighted composite score based on the FTE responses

SYSTEMS AND METHODS FOR EVALUATING BUSINESS-CRITICAL CRITERIA RELATING TO EXPLORING ENTITY MOBILITY/PRODUCTIVITY OPPORTUNITIES

FIELD OF TECHNOLOGY

Aspects of the disclosure relate to methodologies for evaluating business critical criteria. More specifically, this invention relates to evaluating business critical criteria as these criteria relate to exploring entity mobility/productivity opportunities.

BACKGROUND

Currently, there is no consistent approach to evaluate assessment data relating to exploring entity mobility/productivity opportunities.

Without a consistent approach to evaluate data relating to exploring entity mobility/productivity opportunities, project teams have to determine how to conduct and analyze each individual assessment. Conventionally, there are two methods that could be used by the project team, each having certain limitations: one is a Six Sigma[1] project and the second is a survey follow by brainstorming sessions to analyze the survey data.

[1] Six Sigma is a business management strategy, originally developed by Motorola. Six Sigma seeks to identify and remove causes of defects using a set of quality management methods. Such defects may include anything that may lead to customer dissatisfaction.
The Six Sigma methods include statistical methods. These methods create a special infrastructure of people within an entity who are experts in these methods. Typically, each Six Sigma project carried out within an entity follows a defined sequence of steps and may have quantified financial targets—e.g., cost reduction and/or profit increase.

The limitations of the Six Sigma project may be as follows. The Six Sigma project can be time consuming, typically running 2-6 months from project inception until project completion. Six Sigma projects also require a certified expert to conduct and/or coach. Moreover, the expert or coach requires formal training to fill the role as Project Lead and/or Team leader.

The limitations of the brainstorming sessions may be as follows. Conventional brainstorming sessions typically occur in a non-standardized fashion. Furthermore, brainstorming sessions lack the fact-based/decision-based methodology to identify areas critical to the business. Thus, these limitations reduce the effectiveness of brainstorming sessions.

Accordingly, it would be desirable to provide systems and methods for evaluating business-critical criteria with respect to exploring entity mobility/productivity opportunities.

SUMMARY OF THE INVENTION

It is an object of this invention to provide systems and methods for evaluating business-critical criteria with respect to mobility/productivity opportunities.

A method according to the invention for evaluating business-critical criteria relating to exploring entity mobility/productivity opportunities. The method may include calculating a hierarchy of a plurality of decision elements regarding the opportunities. The calculating may include forming a matrix of values corresponding to the relative importance of each of the decision elements with respect to one another.

The method may further include calculating a weighted composite score for each sub-process specified in each of the plurality of decision elements. The method may also include compiling a favorability rating for each sub-process. The favorability rating for each sub-process may be based, at least in part, on the weighted composite score for each sub-process and the matrix of values corresponding to the relative importance of each of the decision elements with respect to one another. Finally, the favorability ratings may be ranked with respect to one another to form a favorability index.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 6 shows a process for rating assessment questions according to the invention;

FIG. 7 shows a matrix for administering the Analytical Hierarchy Process according to the invention;

FIG. 9 shows a matrix that can be used to determine a weighted composite score for different sub-processes (develop, evaluate, implement . . . ) within a decision element—e.g., a measurement system.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, DDR-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

A method according to the invention preferably provides a formal step-by-step methodology to evaluate a set of criteria regarding exploring entity mobility/productivity opportunities exists. The evaluations according to the invention may relate to process improvements, time studies or simply understanding business unit operations. The method can be completed in a relatively short time frame by allowing customization of the survey logic, ease of data collection for the master file, and use of analytical tools for fact-based decision-making.

Figure 1:
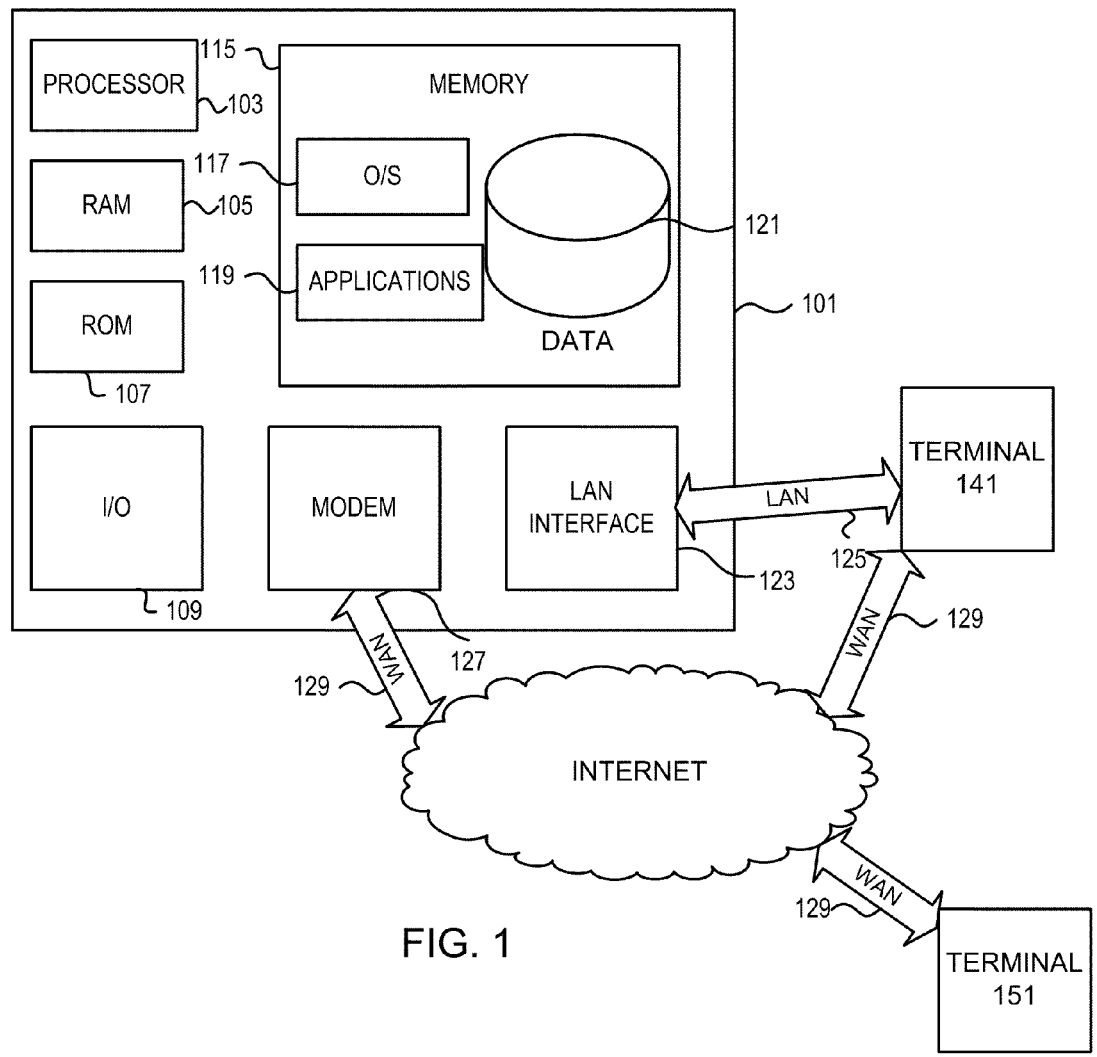
FIG. 1 illustrates a schematic diagram of a general-purpose digital computing environment in which one or more aspects of the present invention may be implemented.

FIG. 1 illustrates a block diagram of a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

I/O module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown). As described in detail below, database 121 may provide centralized storage of account information and account holder information for the entire business, allowing interoperability between different elements of the business residing at different physical locations.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119 used by server 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Figure 2:
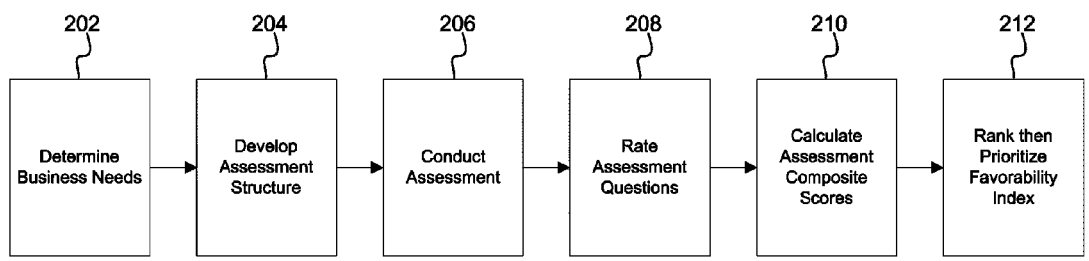
FIG. 2 a high level process according to one embodiment of the invention.

FIG. 2 shows a high level process according to one embodiment of the invention. Step 202 shows determining the business (referred to herein in the alternative as an "entity") needs. The formal structure showing the process for determining the business needs is illustrated in more detail in FIGS. 3A-3B.

Step 204 shows developing an assessment structure. Such a step may include assessing the problem(s) that the business needs to answer. The formal structure showing the process for assessing the business needs is illustrated in more detail in FIG. 4.

Step 206 shows conducting assessment of the business. Such assessment may include sending the survey to the entity personnel.

Step 208 shows rating assessment questions. Such rating may include looking at criteria regarding decision elements. Exemplary questions may include how standardized or customized/complex the process is, determining the existence and/or extent of management routines, whether a measurement system is in place to grade an exemplary process, and whether mobility restrictions apply to the opportunity being examined.

Step 210 shows calculating assessment composite scores based on answers. Step 212 shows ranking and/or prioritizing each opportunity using a favorability index. Preferably, the ranking and/or prioritizing may be based on the calculations of step 210.

Figure 3:
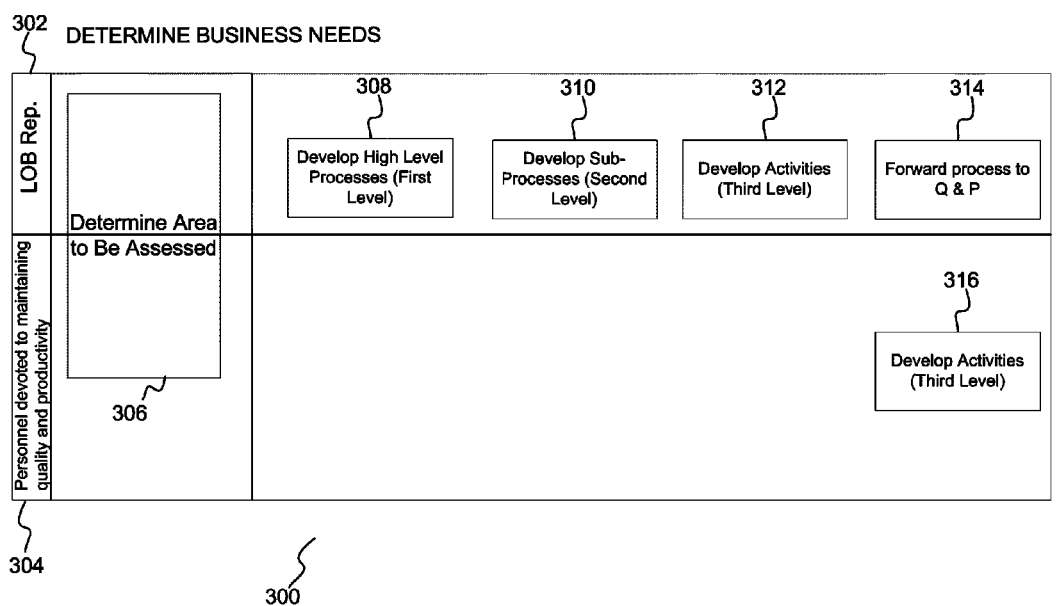
FIG. 3 shows an illustrated flow diagram of a more detailed description of a process for determining business needs according to the invention.

FIG. 3 shows an illustrated flow diagram of a more detailed description of a process 300 for determining business needs, as shown in step 202. First process 300 is divided between two groups of people: personnel devoted to maintaining the quality and productivity of an entity product 304, or, alternatively, a group of people within an entity assigned to the maintenance of selected standards, and a Line of Business ("LOB") representative 302—i.e., a representative from the group within the entity that is sponsoring the entity mobility/productivity opportunity.

Process 300 may include developing the high level processes 308 that may need to be put in place to determine the business needs. Such high level processes 308 may need to be put in place in order to assess the most important of the needs that need to be addressed. Step 310 shows sub-processes may also developed. These sub-processes 310 may be unique to the high level processes in which they are resident or, alternatively, sub-processes 310 may stretch across different high level processes to which they may be equally applicable.

Step 312 shows developing activities that may help to determine business needs. When steps 308, 310, and 312 have been sufficiently implemented, the results of the determination of the business needs can be forwarded to standards maintenance personnel. Thereafter, the standards maintenance personnel can further develop activities 316 in order to ensure that the business needs are adequately addressed.

Figure 4:
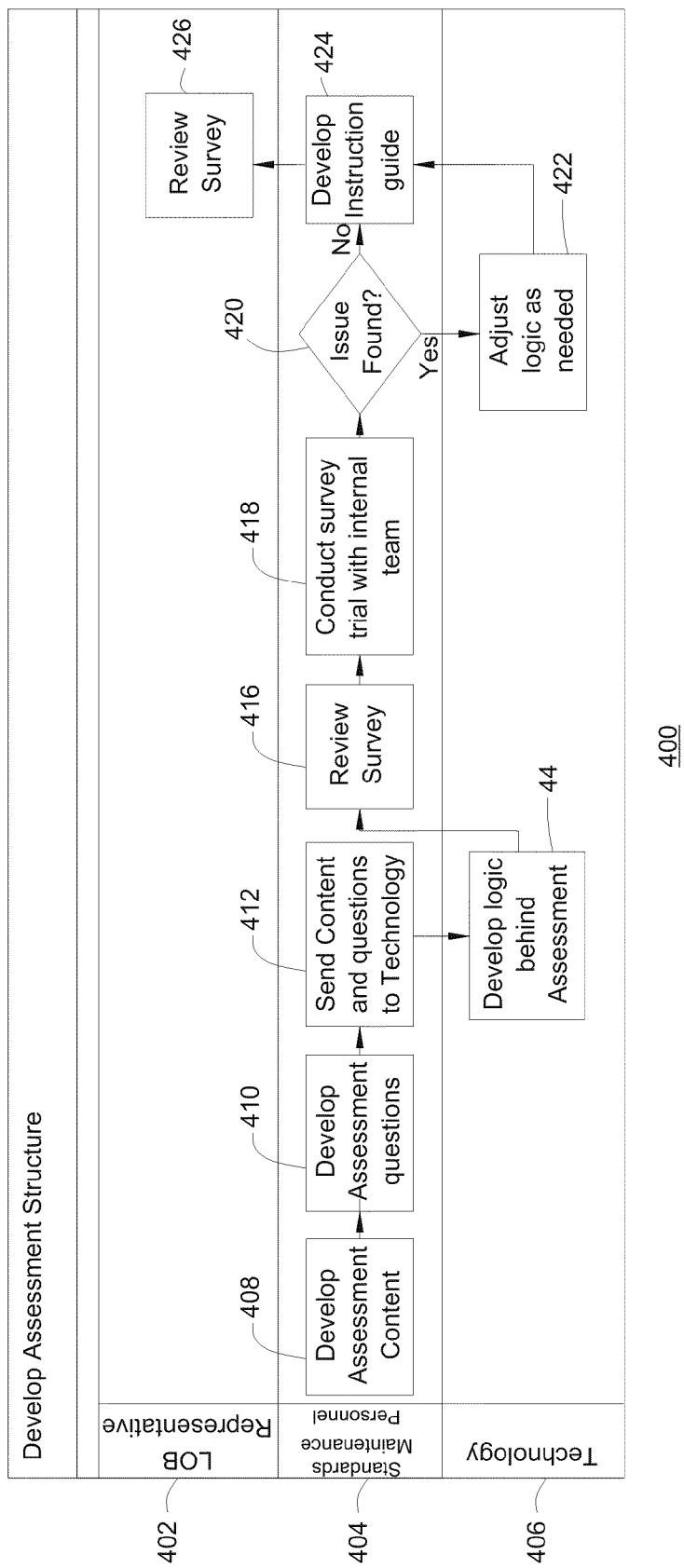
FIG. 4 shows an illustrative flow diagram of a process for the development of an assessment structure according to the invention.

FIG. 4 shows an illustrative flow diagram of a process for the development of an assessment structure 400 according to the invention. It should be noted that process 400 preferably also includes a technology element 406, in addition to LOB element 402 and standards maintenance element 404.

Step 408 shows developing assessment content—i.e., determining the problem that the entity needs to answer. Thereafter, step 410 shows developing a set questions that address the content determined by step 408 to be business critical. Such questions may include querying how standardized/complex is the business process being analyzed; are management routines currently in place; is there a measurement system in place that grades the process being analyzed; are there mobility restrictions that may affect the entity mobility of the process being analyzed; or other suitable questions.

Step 412 shows transmitting such content and/or questions to a technology center. Such technology center may preferably develop an overarching logic behind the assessment being conducted, as shown in step 414. Once the logic behind the assessment has been determined, then the survey may be reviewed, as shown at step 416, and a trial survey with an internal team may be conducted, as shown at step 418.

If issues with the survey are found, as shown at step 420, then the logic of the survey may be adjusted as shown at step 422. If no substantial issues are found, or if the issues that were found have been addressed, then an instruction guide for the implementation of the survey may be prepared by standards maintenance personnel, as shown at step 424. In one embodiment of the invention, an LOB representative(s) may review the survey, at step 426.

Figure 5:
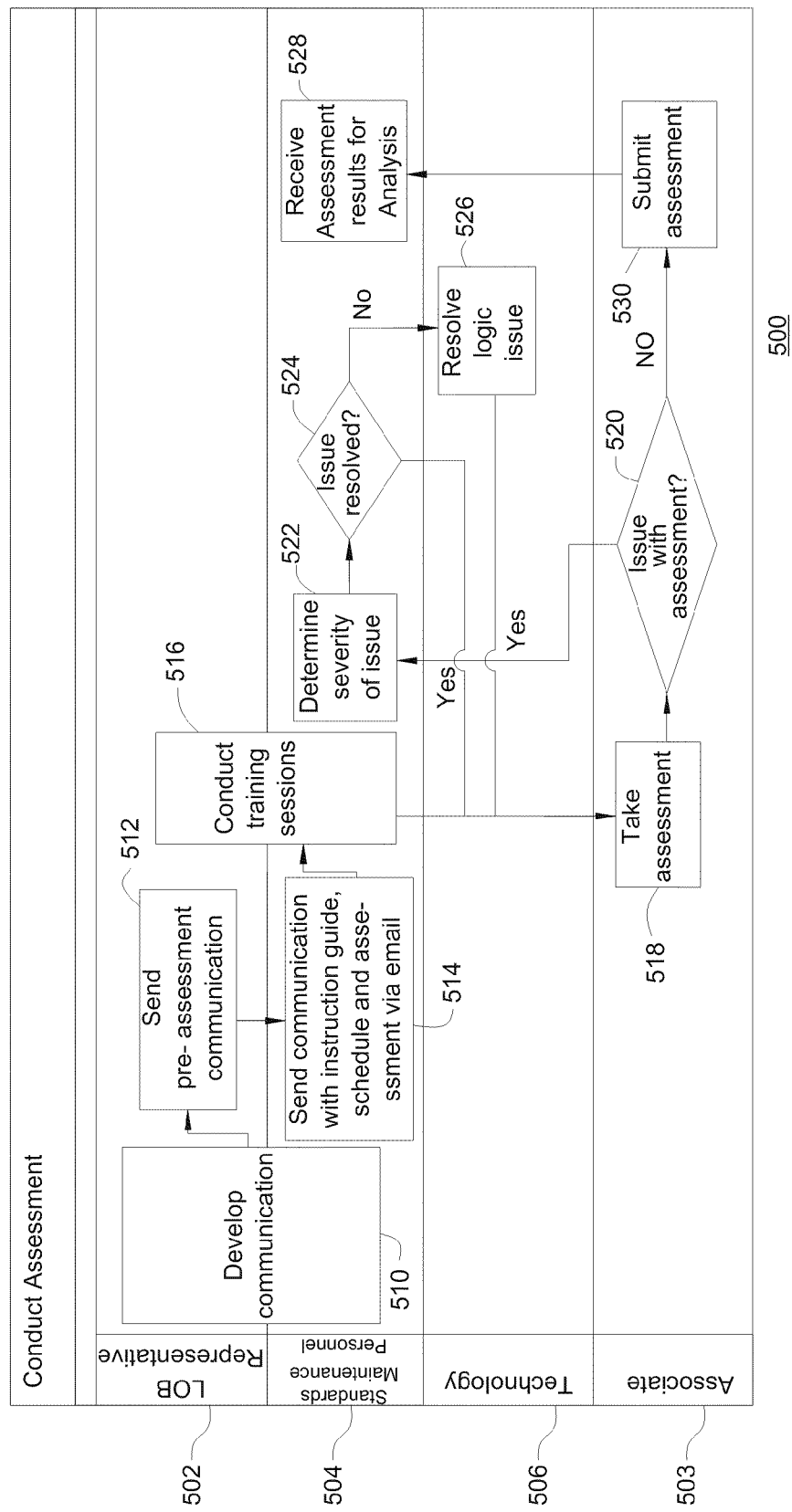
FIG. 5 shows an illustrative flow diagram which shows a process for conducting the assessment according to the invention.

FIG. 5 shows an illustrative flow diagram which shows a process for conducting the assessment according to the invention 500. It should be noted that process 500 may include an LOB representative 502, standards maintenance personnel 504, a technology component 506, and an associate 508.

In order to conduct the assessment, communication between the LOB rep. 502 and standards maintenance personnel 504. Then, pre-assessment communication 512 may be transmitted from the LOB representative. Communication 512 may be followed by a communication including an instruction guide, a training schedule and an assessment which may be transmitted via e-mail 514.

Once the LOB rep. 502 and the standards maintenance personnel 504 have all the foregoing material, a training session may be conducted, as shown at 516. Such a training session may preferably educate certain individuals in the implementation of taking the assessment. Such an assessment, which may include transmitting surveys, may preferably provide a deeper level of understanding of the business. The assessment is taken at step 518.

If issues arise with respect to the assessment, the process may determine the severity of the issue, as shown at step 522. If no substantial issues arise with respect to the assessment, the assessment may be submitted, as shown at step 530. The assessment results may be received, and preferably processed for analysis, as shown at step 528.

Following the determination of the severity of the process, as shown at step 522, process 500 may query whether the issue is resolved at step 524, and then proceed to retake the assessment at step 518. If the issue is not resolved, then the logic behind the assessment should preferably be resolved at step 526 and the process may return to retake the assessment at step 518.

FIG. 6 shows a process 600 for rating assessment questions according to the invention. Such rating may include compiling the assessment questions, as shown in step 602. Once compiled, the questions may be rated using an analytical hierarchy process ("AHP"). The AHP process is discussed in more detail below in the portion of the specification corresponding to FIG. 7.

Rating the questions may preferably provide an AHP sum for each of the questions, as shown in step 606. Thereafter, the questions may be ranked in terms of importance, as shown in step 608.

FIG. 7 shows a matrix for administering the AHP according to the invention described in FIG. 6. FIG. 7 shows that process 700 preferably includes building a hierarchy of decision elements (such elements may preferably be drawn from a selected number of the assessment questions).

Matrix 700 preferably includes exemplary categories such as measurement system 702, management routines 704, documentation 706, mobility restrictions 708, standardization 710 and complexity 712. Each of these categories is presented to the survey participants. Then, each of the participants is asked to provide his/her perceptions of the importance of each of the categories with respect to another of the categories. It should be noted that the questions that provide the hierarchy information may form only a small part of the total sum of the assessment questions.

In this particular embodiment of the matrix, a score of 0.1111 indicates a measurement system is substantially less relevant than mobility restrictions, where the relative importance of a measurement system is being evaluated with respect relative importance of mobility restrictions. A score of 9 indicates that mobility restrictions are substantially more relevant than a management routine. A score of 1 indicates a perceived equivalent importance between, for example, a measurement system and a management routine. A score of 0.3333 indicates a level of importance of between 0.1111 and 1 and a score of 3 indicates a level of importance of between 1 and 9.

In matrix 700, the rank of each of the component categories is determined and, preferably, displayed. The ranks preferably determine the perception of the importance of the relevant categories. It can be seen that mobility restrictions are perceived as, by far, the most important category, followed by complexity, standardization, measurement system together with management routines, and finally, documentation. The vertical sum is the tally of each individual column, i.e., 1st column: 1, 0.333, 9, 3,=16.3333.

Figure 8:
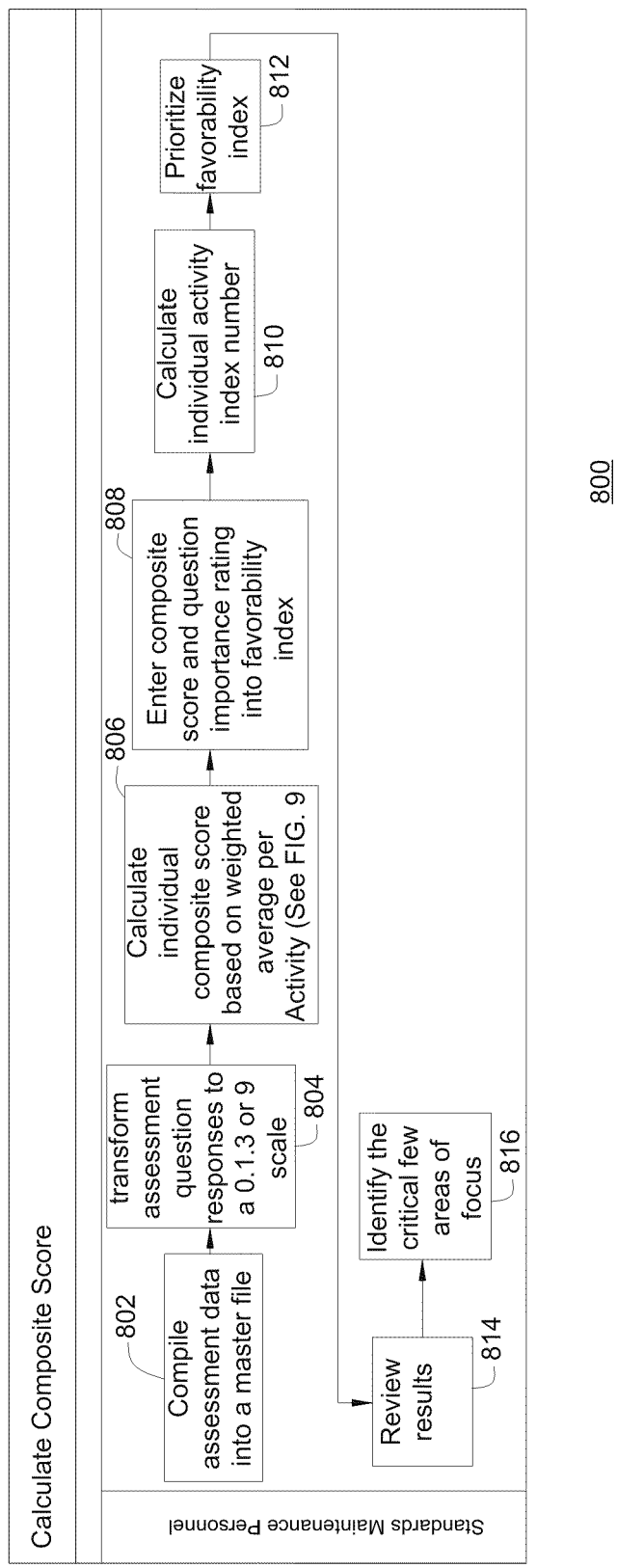
FIG. 8 shows an illustrative flow diagram for the calculation of a composite score for the aspect of the process being assessed.

FIG. 8 shows an illustrative flow diagram 800 for the calculation of a composite score for the aspect of the process being assessed. Such a calculation may preferably be used to generate matrix 700 shown in FIG. 7.

Step 802 shows compiling the assessment data into a master file. Such assessment data preferably includes most if not all of the data obtained from the assessment questions. These results are not necessarily tied directly to the results displayed in the matrix shown in FIG. 7.

Step 804 shows transforming the assessment question response according to a 0, 1, 3, and 9 scale. A 0 score preferably represents that the person surveyed believed that the process or sub-process being evaluated was used 0% of the time the opportunity was implemented; a 1 score preferably represents 25% implementation, 3 corresponds to a 75% implementation and 9 corresponds to a 100% implementation.

Step 806 shows calculating the individual composite score based on weighted average per activity (the aspect related to formation of the weighted composite score is shown in more detail in FIG. 9). Step 808 shows entering the composite score and question importance rating into a favorability index.

Thereafter, step 810 shows calculating an individual activity index number based on the processes used and ranked for a predetermined activity. The index numbers may then be prioritized, as shown in step 812, the results reviewed as shown in step 814, and the critical areas of focus can be determined, as shown in step 816.

FIG. 9 shows a matrix 900 that can be used to determine a weighted composite score for different sub-processes (develop, evaluate, implement . . . ) within a decision element (an element upon which a mobility decision may be based). An example of a decision element is a measurement system. It should be noted that alternative methods for implementing weighting principles to evaluate each of the categories may be implemented without departing from the scope of the invention.

FIG. 9 specifically shows an example of a measurement system weighted composite score based on the Full Time Equivalents ("FTE") (a measure of the man-hours) needed to implement the various aspects of entity mobility with respect to the process being assessed. Such aspects may include developing the measurement system, evaluating the measurement system, implementing the measurement system and other suitable aspects.

The matrix in FIG. 9 preferably provides as an output a ranking associated with the FTEs required to develop, evaluate, implement such a measurement system. The rank to value may be similar to the scale described above—i.e., 100%=9, 50%=3, 25%=1, 0%=0.

The ranking may be obtained as follows. Column A shows the sub-processes being evaluated. Column B shows the possible scores that have been assigned to the corresponding sub-process. Column C indicates how many FTEs have responded that the corresponding sub-process should receive the 0, 1, 3, or 9 score of importance. To obtain the weighted composite score for each sub-process, each score is multiplied by the corresponding FTE. Then, the product of each score and corresponding FTE is summed for the single sub-process. Then, the sum is divided by the sum of all the FTEs for the sub-process to obtain the weighted composite score.

Figure 10:
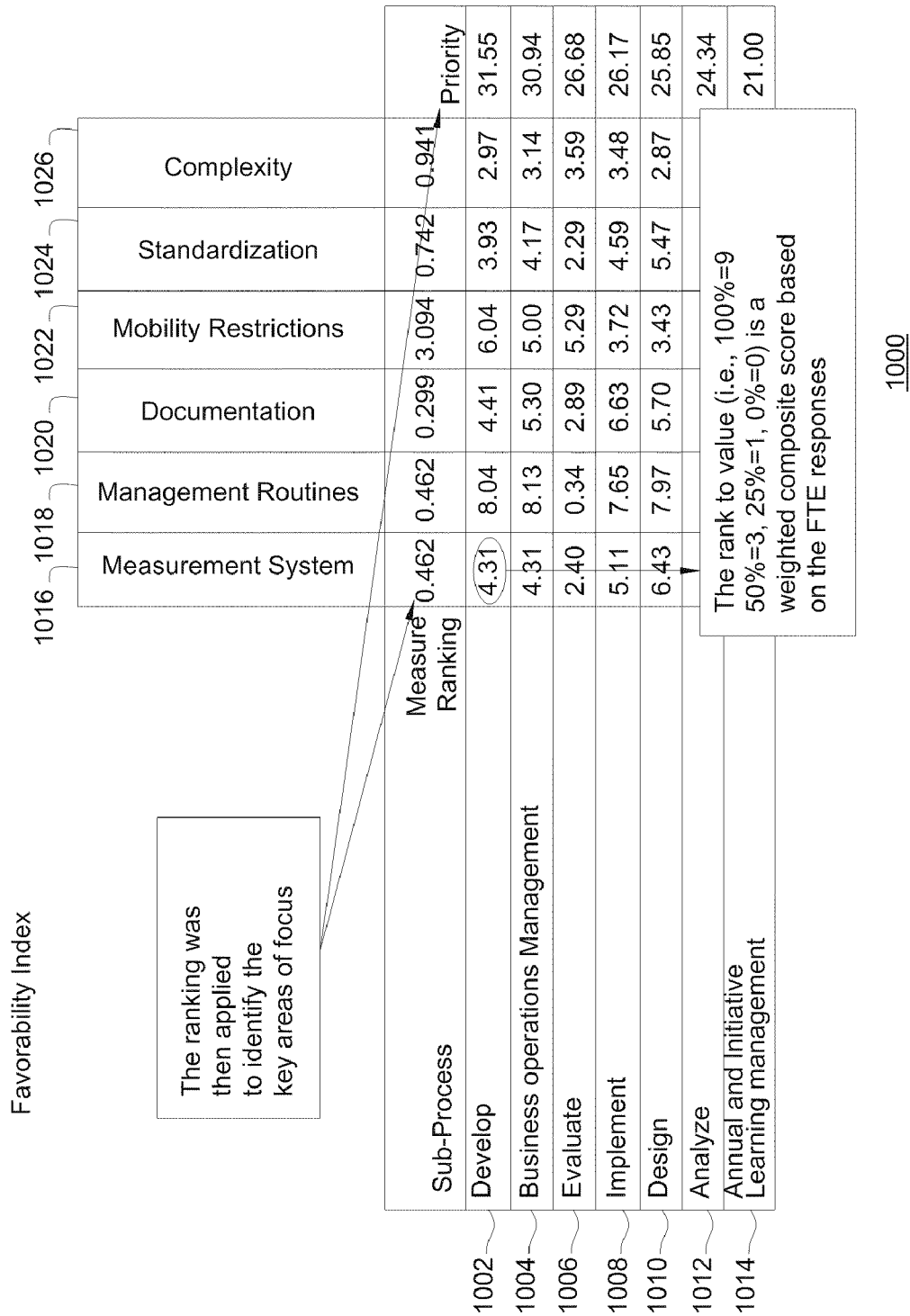
FIG. 10 shows a matrix which defines one embodiment of a favorability index according to the invention.

FIG. 10 shows a matrix 1000 which defines one embodiment of a favorability index 1000 according to the invention. Such a favorability index may include a rating of sub-process such as develop 1002 the decision element (such as measurement system etc.), business operations management 1004, evaluate 1006, implement 1008, design 1010, analyze 1012, and annual and initiative learning management 1014 with respect to the various aspects such as measurement systems 1016, management routines 1018, documentation 1020, mobility restrictions 1022, standardization 1024, and complexity 1026.

The ranking may be further refined to identify the key areas of focus with respect to the mobility assessment. Such a matrix preferably obtains a priority output. Such priority output ranks the sub-processes in order to obtain the priority of sub-processes for the portion of the entity being analyzed with respect to mobility/productivity assessment. One preferable formula that may be used in this embodiment to obtain the priority column is to take the product of each cell in a particular sub-process—e.g., cells 1028, 1030, 1032, 1034, 1036, and 1038—multiply the cell by the FTE associated with its respective aspect—e.g., measurement system. Then, for the particular sub-process, sum all the products to obtain a value for use with the favorability index. Thereafter, each of the favorability index values can be ranked with respect to each other to determine which sub-process may require the greatest effort regarding the assessment determination.

Accordingly, a survey-based assessment process for evaluating entity mobility/productivity opportunities has been provided. The process, according to the invention, may further include providing a process that does not require specially trained leaders, yet produces consistent results as well as improves speed, reduce cost, increases quality and customer satisfaction, while minimizing the risk associated with evaluating these opportunities.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for survey-based assessment process for evaluating entity mobility-productivity opportunities helping according to the invention have been provided. Persons skilled in the art will appreciate that the present invention can be practiced by other than the described embodiments, which are presented for purposes of illustration rather than of limitation, and the present invention is limited only by the claims which follow.

What is claimed is:

1. One or more non-transitory computer-readable media storing computer-executable instructions which, when executed by a processor on a computer system, perform a method for evaluating business-critical criteria for an entity mobility/productivity opportunity, the method comprising:

calculating a hierarchy of a plurality of decision elements regarding the opportunities, wherein the plurality of decision elements includes at least two decision elements selected from a group comprising a measurement system, management routines, documentation, mobility restrictions, standardization, and complexity, and wherein said calculating comprises forming a matrix of values corresponding to the relative importance of each of the decision elements with respect to one another;

calculating a weighted composite score for a sub-process specified in each of the plurality of decision elements;

compiling a favorability rating for each sub-process, wherein the favorability rating for each sub-process is based, at least in part, on the weighted composite score for each sub-process and the matrix of values corresponding to the relative importance of each of the decision elements with respect to one another, said rating being calculated using the following equation: (the weighted composite score for each sub-process for a single decision element)*(a value associated with the single decision element obtained from the calculation of the hierarchy of the plurality of decision elements)+(the weighted composite score of each of the sub-processes) *(the corresponding number for each decision element) in order to obtain the favorability index value;

ranking each favorability rating to form a favorability index.

2. The media of claim 1 wherein each weighted composite score is based, at least in part, on the determination by an individual of the relative importance of each sub-process with respect to the other sub-processes.

3. The media of claim 2 wherein the weight of the individual's determination is adjusted according the amount of time the individual works relative to a full-time employee.

4. The media of claim 1 wherein the sub-process includes at least one of:

developing a process directed to a decision element, evaluating the process, implementing the process, designing the process, or analyzing the process.

5. The media of claim 1 wherein the calculating a hierarchy of a plurality of decision elements regarding the opportunities comprises using information obtained in a survey to form the hierarchy.

6. A method for evaluating business critical-criteria for an entity mobility/productivity opportunity, comprising the utilization of a processor to perform the following steps:

forming a hierarchy of a plurality of decision elements regarding the opportunities wherein the plurality of decision elements includes at least two decision elements selected from a group comprising a measurement system, management routines, documentation, mobility restrictions, standardization, and complexity, and wherein said forming the hierarchy comprises forming a matrix of values corresponding to the relative importance of each of the decision elements with respect to one another;

calculating a weighted composite score for a sub-process with respect to each of the plurality of decision elements;

compiling a favorability rating for a plurality of sub-processes, wherein the favorability rating for each sub-process is based, at least in part, on the weighted composite score, for each sub process and the hierarchy of the plurality of decision elements, and on the weighted composite score for each sub-process and the matrix of values corresponding to the relative importance of each of the decision elements with respect to one another;

further compiling said rating using the following equation: (the weighted composite score for each sub-process for a single decision element)*(a value associated with the single decision element obtained from the calculation of the hierarchy of the plurality of decision elements)+(the weighted composite score of each of the sub-processes) *(the corresponding number for each decision element) in order to obtain the favorability index value; and ranking each favorability rating relative to each other favorability rating to form a favorability index.

7. The processor device configured to perform the method of claim 6 wherein the weight of the individual's determination is adjusted according to the amount of time the individual works.

8. The processor device configured to perform the method of claim 6 wherein the sub-process includes at least one of:

developing a decision element, evaluating a decision element, implementing a decision element, designing a decision element, analyzing a decision element, or implementing a learning process with respect to the decision element.

9. The processor device configured to perform the method of claim 6 wherein the forming a hierarchy of a plurality of decision elements regarding the opportunities comprises the using information obtained in a survey to determine the relative importance of the decision elements.

* * * * *